Figure 1:
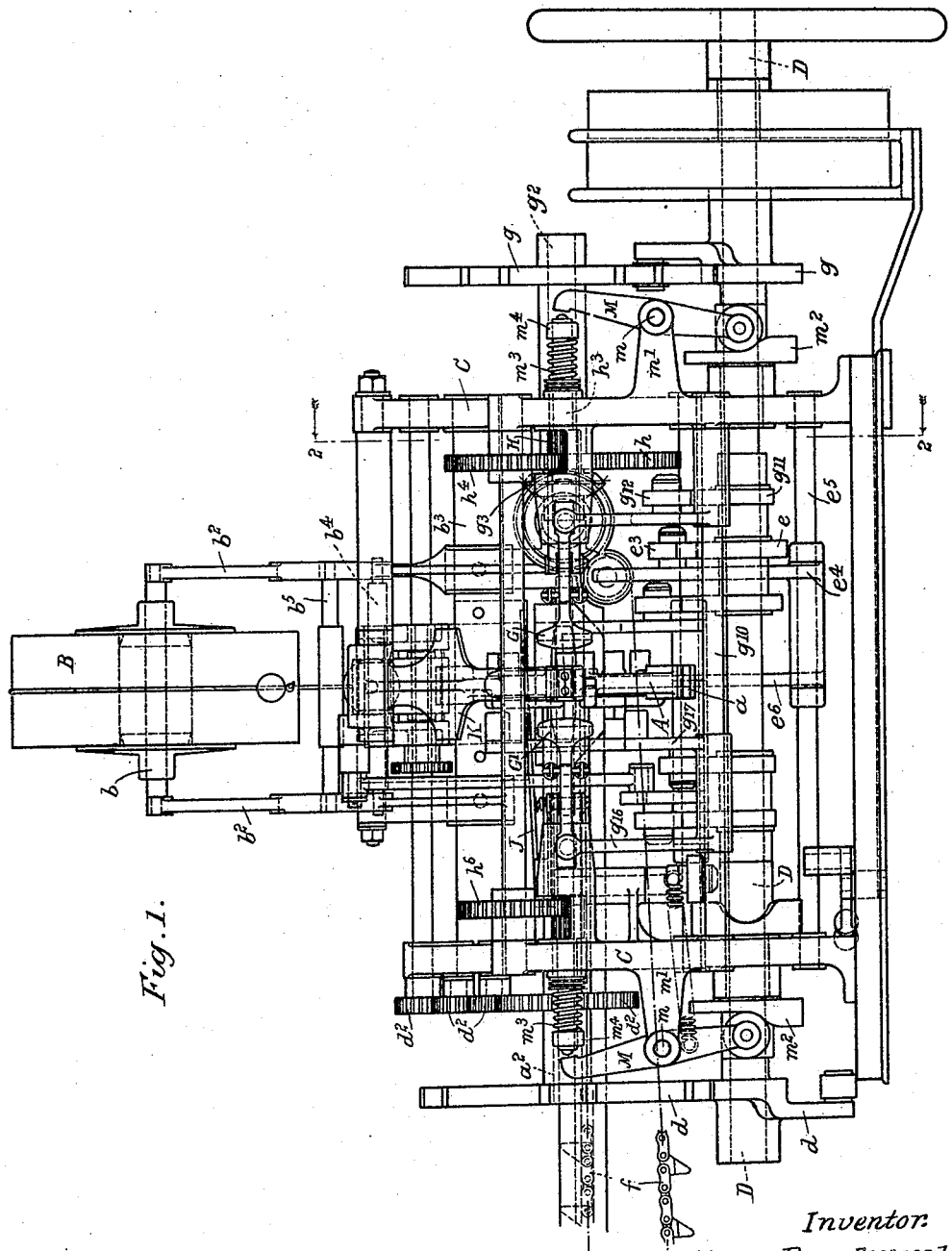

H. ROSE, DEC'D.
W. H. ROSE, ADMINISTRATOR.
MACHINE OR APPARATUS FOR WRAPPING CAKES OR BLOCKS, SUCH AS CARAMELS OR OTHER SWEETMEATS, AND THE LIKE.
APPLICATION FILED JAN. 6, 1921.

1,414,831.

Patented May 2, 1922.
9 SHEETS—SHEET 1.

Inventor:
Henry Rose, Deceased.
William Henry Rose, Administrator.

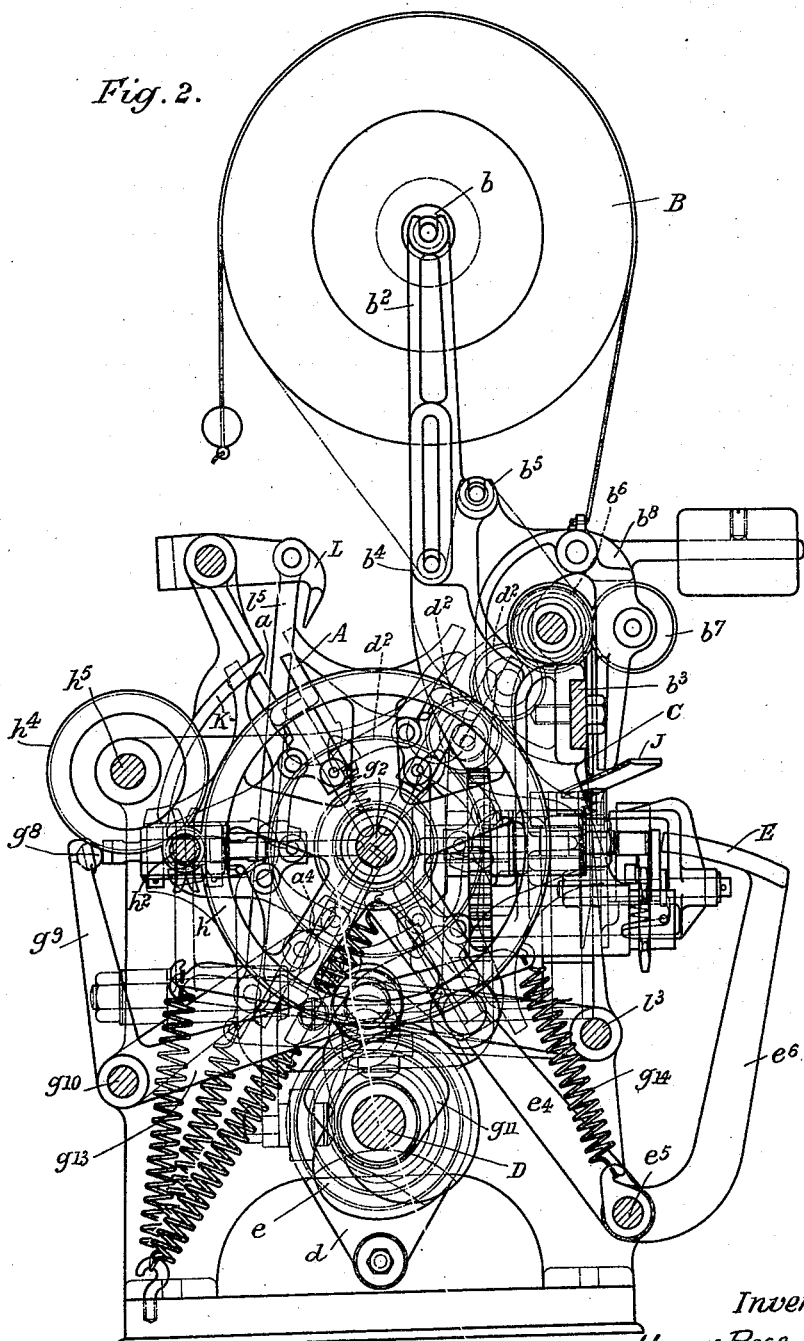

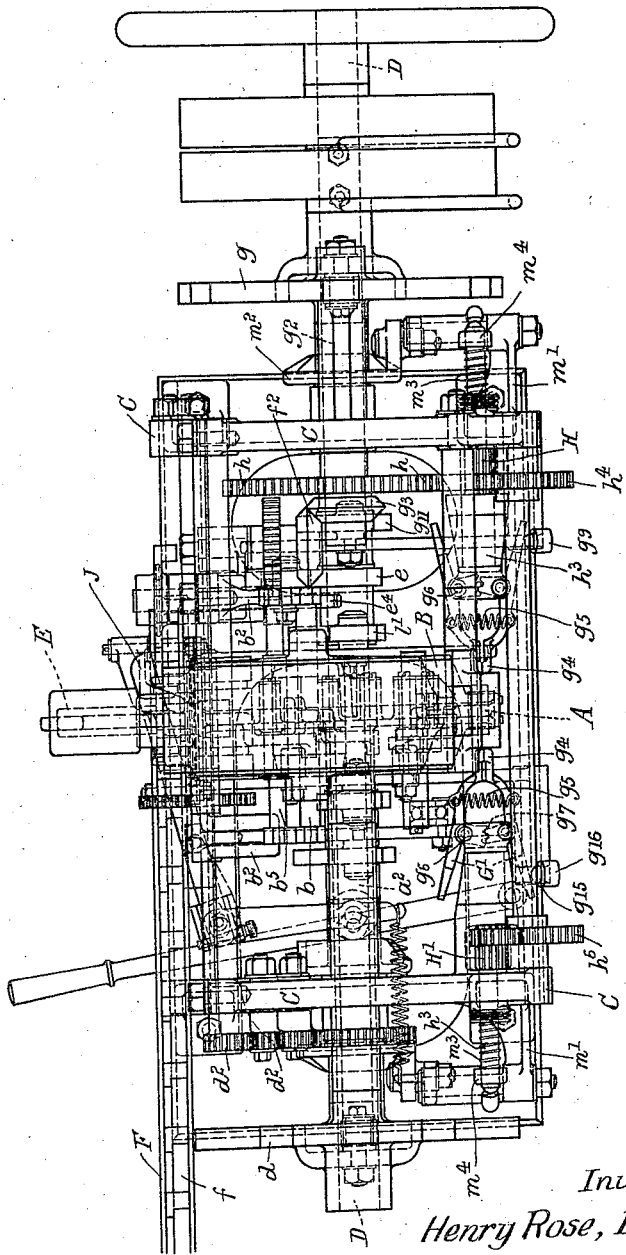

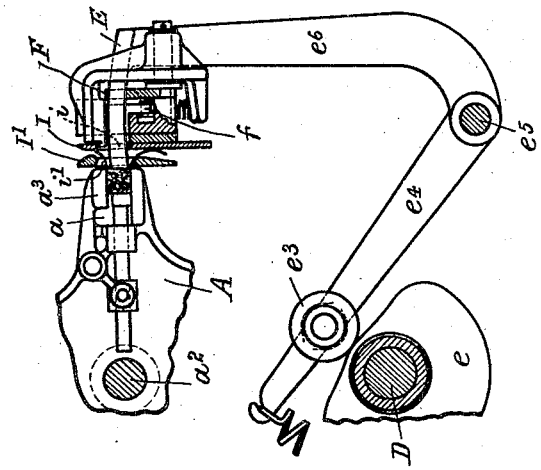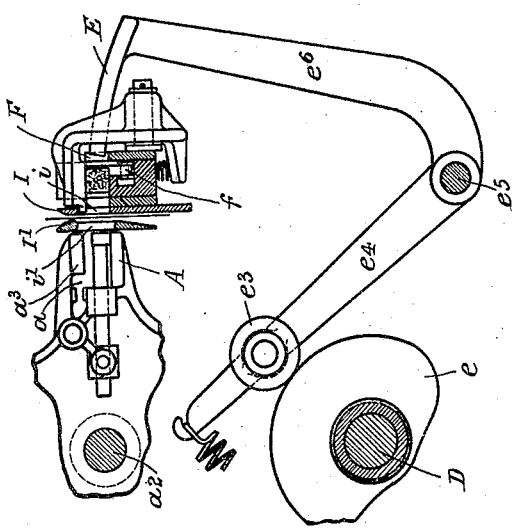

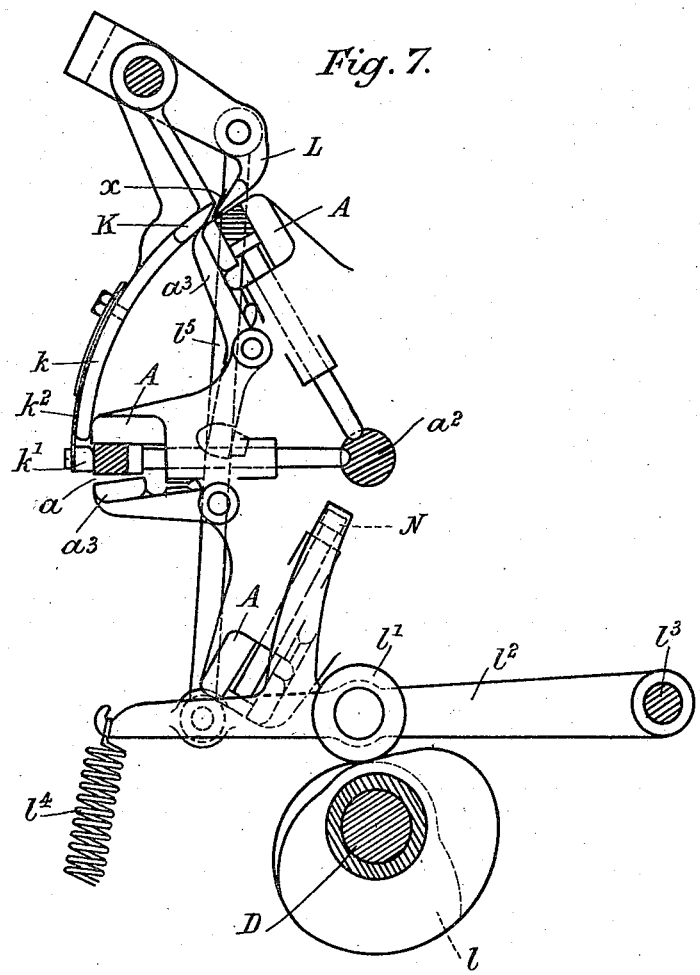

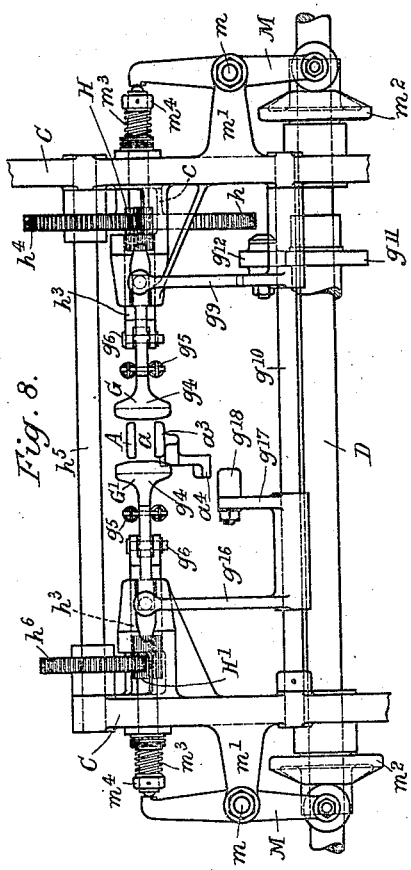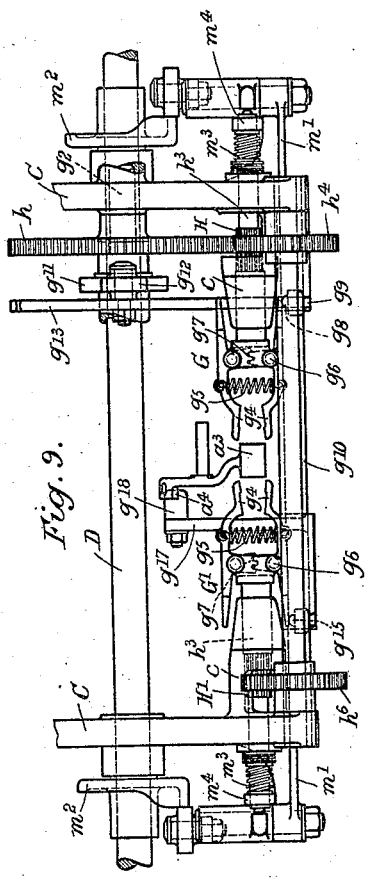

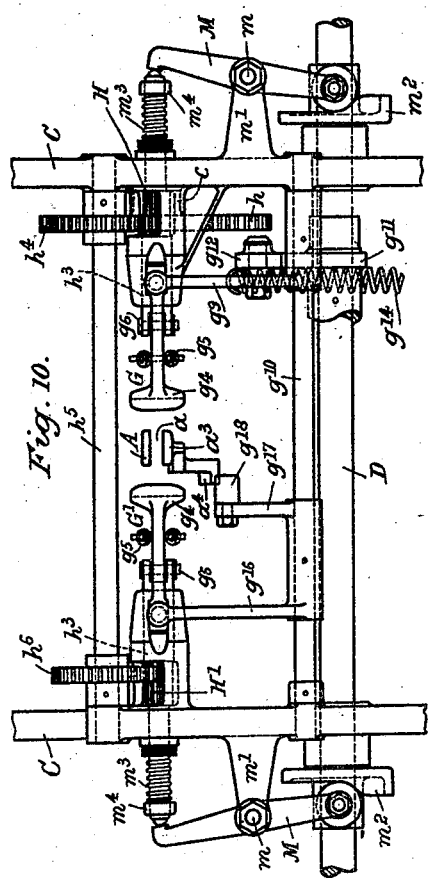

H. ROSE, DEC'D.
W. H. ROSE, ADMINISTRATOR.
MACHINE OR APPARATUS FOR WRAPPING CAKES OR BLOCKS, SUCH AS CARAMELS OR OTHER SWEETMEATS, AND THE LIKE.
APPLICATION FILED JAN. 6, 1921.
1,414,831.
Patented May 2, 1922.
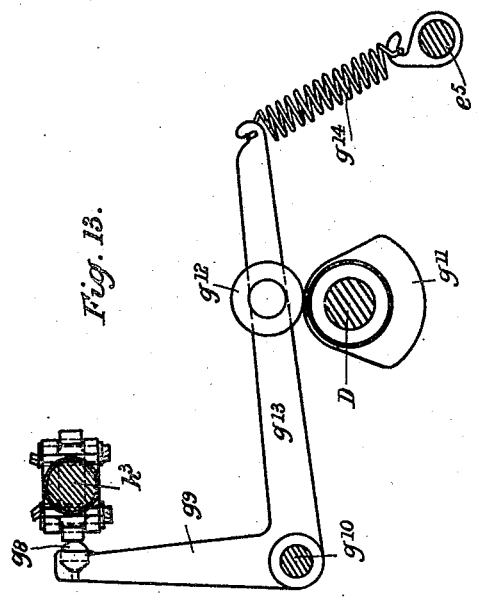
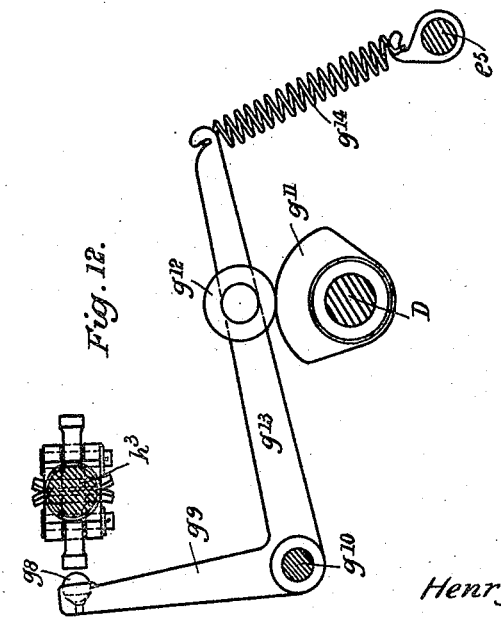
Inventor:
Henry Rose, Deceased.
William Henry Rose, Administrator.
ATTORNEYS

UNITED STATES PATENT OFFICE.

HENRY ROSE, DECEASED, LATE OF GAINSBOROUGH, ENGLAND, BY WILLIAM HENRY ROSE, ADMINISTRATOR, OF GAINSBOROUGH, ENGLAND.

MACHINE OR APPARATUS FOR WRAPPING CAKES OR BLOCKS, SUCH AS CARAMELS, OR OTHER SWEETMEATS, AND THE LIKE.

1,414,831.     Specification of Letters Patent.     Patented May 2, 1922.

Application filed January 6, 1921. Serial No. 435,549.

(GRANTED UNDER THE PROVISIONS OF THE ACT OF MARCH 3, 1921, 41 STAT. L., 1313.)

*To all whom it may concern:*

Be it known that HENRY ROSE, deceased, a subject of the King of Great Britain, and resident of Albion Works, Gainsborough, England, invented certain new and useful Improvements in Machines or Apparatus for Wrapping Cakes or Blocks, Such as Caramels or Other Sweetmeats, and the like, (for which has been filed application in Great Britain May 28, 1919, Patent No. 150,076,) of which the following is a specification.

This invention relates to machines, or apparatus, for wrapping cakes, or blocks, such, for instance, as caramels, or other sweetmeats, and the like, (which for brevity we will refer to as caramels) the said machines, or apparatus, being of the type in which the caramels are passed, with the wrappers, into recesses in a mould-wheel (capable of movements of partial rotation) whereby the wrappers are folded around three sides of the caramels, the wrapping of the fourth side being effected by movable and stationary folders and the final wrapping being effected by twisting, in the same direction, the projecting open ends of the wrappers after which the wrapped caramels are removed by an ejector from the recesses in the mould-wheel.

This invention has for its object to provide an improved machine, or apparatus, of the aforesaid type which will effect the wrapping more efficiently and expeditiously than hitherto and consists mainly in the improved construction, arrangement and operation of the parts, as hereinafter described, whereby a portion of one of the outstanding ends of the wrapper is first folded onto the outer, or fourth, side of the caramel and the remaining portion of the said end is bent back upon itself and then this portion together with the other outstanding end of the wrapper are folded onto the first mentioned portion so that, at the said outer or fourth, side of the caramel there are three superposed layers of wrapping material which conjointly act to more effectually prevent dust, or the like, gaining access to the caramel between the lapped portions of the wrapper as the twisting of the ends tends to hold the bent-back or mid-portion, of the wrapping material in close contact with the outer portion. A yieldable presser acts to hold the folded ends of the wrapper in position on the caramel whilst the aforesaid twisting is being effected.

The mechanism by which the mould-wheel is operated may be of the well known "Geneva" kind usually employed in machines, or apparatus, of the aforesaid type and the material for the wrappers (which we will presume to be paper) may be supported in the form of a rotatable roll and be led over guides and fed intermittently to cutters as usual. If the cutting be effected before the caramel has pushed its portion of wrapping paper into the recess on the mould-wheel, a stop will be provided at a distance from the cutters in accordance with the length required for the wrappers.

The paper may be guided in any suitable way, it being preferably kept taut by being passed beneath a jockey-roller, or rod, capable of rising and falling, the paper being then brought upwards and passed over a roller and then down between rollers one of which is driven intermittently to accord with the intermittent movements of the mould-wheel which movements will bring the recesses therein successively into proper positions for the reception of the papers and the caramels, and for the subsequent wrapping operations.

A pressure roller is preferably provided for giving a grip on the paper-feeding roller, the said pressure roller being carried by an arm so that it can be raised and held away from its associate roller, which can then rotate inoperatively. The caramels are fed into a trough provided with an endless belt, or band, or chain caused to travel intermittently to convey the caramels to a position opposite the paper in a pocket or space, which may be between guide-plates with openings therein in line with a recess in the mould-wheel when a pusher pushes the caramel and paper through the openings in the guide plates and into the recess in the mould-wheel the caramel being thus covered on three sides by the paper the outer edges of which stand out beyond the periphery of the mould-wheel to a sufficient extent to provide material to fold over the outer, or fourth, side and encircle the caramel completely and to overlap to any desired extent, the paper also extending on either side of the mould-wheel to a sufficient extent to allow for twisting to complete the wrapping, or enclosure, of the caramel. The aforesaid openings in the pocket, or plates, for the paper act as guides to control the paper when being pushed along with the caramels into the recesses in the mould-wheel and assist in creasing the paper as required. The opening in the first guide-plate is of a width and length which will allow of the pushing therethrough of the caramel from the belt, or band, or chain, into the recess in the mould-wheel, the opening in the second guide-plate being of a length which will allow the whole width of the wrapper to pass through and the portions which are to be subsequently twisted to project from the recess in the mould-wheel. The mould-wheel then makes a partial rotation when the same operations on the succeeding caramel and paper are performed, this partial rotation of the mould-wheel bringing the first mentioned caramel and paper to a position in which the outstanding portions of the paper projecting beyond the periphery of the mould-wheel are folded over the caramel, by a folder operated by any suitable means, which folds a portion of the rear outstanding end of the paper (which may be long enough to overlap to any desired extent) onto the outer, or fourth, side of the caramel and then the remaining portion of the said rear end and the forward outstanding end of the paper pass under a stationary folder whereby they are both folded onto the first mentioned portion on the outer, or fourth, side of the caramel. The mould-wheel then makes a further partial rotation and an extension from the aforementioned stationary folder, or other suitable part, which is fixed in a position concentric with the mould-wheel shaft, retains the paper in its folded position until its ends which extend beyond the sides of the mould-wheel are twisted which completes the wrapping, or folding. If the wrapper has a further overlapping portion, this can be folded down by a folder (operated by any suitable cam and connections) before the twisting operations. The twisting is effected by two sets of grippers which can be mounted in bearings in the main frames of the machine the jaws of the said grippers being caused, by any suitable means, to open and afterwards close and grip the projecting open ends of the wrapper the said grippers being caused to have rotary movement for twisting. The grippers have also longitudinal movement towards each other to follow up the shortening of the ends of the paper due to the twisting. To ensure the proper gripping of the paper a roughened ridge, or the like, may be provided on each gripper face. To compensate for irregularity of the shape of the caramels, the first folded ends of the wrapper should be under control while twisting is being performed. For this purpose we may provide a yieldable presser on the lower end of the extension from the stationary folder, the said presser bearing on the paper sufficiently to keep the caramel in proper position. One of the sides of each of the recesses in the mould-wheel may be yieldable and be controlled by a spring and by any suitable levers, one lever operating to allow the caramels to be pushed into the recesses in the mould-wheel and another lever operating to slightly release the caramels when the grippers are twisting the ends of the wrappers. The bottom of each recess in the mould-wheel is connected to a sliding spindle and so operated, at the proper times, and in any suitable way, so as to eject the wrapped caramels from the recesses in the mould-wheel. The bottoms of the recesses may project from each side of the mould-wheel to assist in controlling the wrappers as they are being pushed, with the caramel, into the recesses in the mould-wheel.

The accompanying drawings show a machine comprising the improvements in accordance with the present invention, which is not limited however, to the precise details illustrated in the said drawings, and described with reference thereto.

Figure 1 is a side elevation, Figure 2 a section through the line 2, 2, Figure 1, and Figure 3 a plan.

Figure 6:
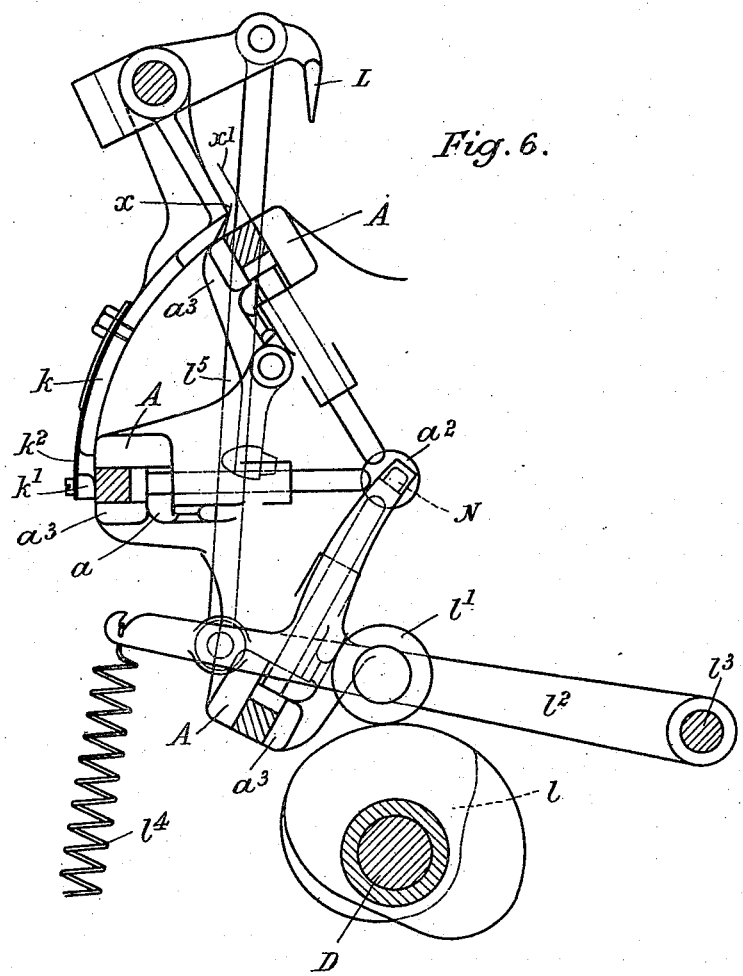

Figures 4 to 13, both inclusive, show, separately, details of the several devices which constitute the main features of this invention, Figures 4 and 5 showing, in elevation and transverse section, and in two different positions, the devices by means of which the caramels are fed into the recesses in the mould-wheel, Figures 6 and 7 showing, in end elevation, partly in section, and in two different positions, the devices for folding the wrappers around the caramels, means for holding the wrapper in position on the caramel, and means for ejecting the completely wrapped caramel from the recess in the mould-wheel, Figures 8 and 10 showing in side elevation, and Figures 9 and 11 in plan, also in two different positions, the devices for twisting the ends of the wrappers which have been folded around the caramels, whilst Figures 12 and 13 show, in two different positions, a device by which the grippers are closed to grip the ends of the wrapper to be twisted.

The mould-wheel A, has in it the recesses $a$, into which the caramels and their wrapping papers are passed. The said mould-wheel has movements of partial rotation imparted to it which may be effected by any suitable, or known, means such, for example, as the "Geneva" mechanism usually employed in machines of this type. The roll of paper B is carried by the reel $b$ the trunnions of which are mounted in supports $b^2$ carried by a bar $b^3$ connected to the framing C, of the machine, the paper being led from the said roll B, beneath a jockey-roller $b^4$ capable of rising and falling, the paper being then brought upwards and passed over the roller $b^5$ and then down and between rollers $b^6$ and $b^7$, the roller $b^6$ being driven intermittently to accord with the intermittent movements of the mould-wheel A. This may be effected by a "Geneva" movement such as that hereinbefore referred to. The roller $b^7$ gives the necessary grip upon the paper on the feeding roller $b^6$, the said roller $b^7$ being carried by a counter-weighted arm $b^8$, so that the said roller can be held away from the rollers $b^6$ when it is desired that the paper shall not be fed. The intermittent movements of the paper and of the mould-wheel A, in accordance with each other, are transmitted from the main driving shaft D by the drive (indicated at $d$), which operates the shaft $a^2$ of the mould-wheel A, similarly to the manner in which the mould-wheel is operated, the shaft $a^2$ also operating the paper-feed through the gear-wheels $d^2$, synchronously with the intermittent movements of the mould-wheel A, so that sufficient paper for a wrapper is presented in position before each recess in the mould-wheel, as it comes round, when the pusher E pushes the caramel together with the wrapper, into the recess, the said pusher E being operated from the main shaft D by a cam $e$ (see Figures 4 and 5) on the said shaft D acting upon the roller $e^3$ on one arm of the lever $e^4$ mounted on the spindle $e^5$ the other arm $e^6$ of the said lever constituting, or carrying, the pusher E.

The caramels to be wrapped are fed into the trough F in which runs an endless belt $f$, or chain caused to travel intermittently, synchronously with the intermittent periods of rest of the mould-wheel A and the paper-feed, through the gearing, illustrated in Figures 1, 2, and 3, consisting of a drive $g$ from the shaft D, operating the shaft $g^2$, a bevel-wheel $g^3$ which gears with another bevel-wheel $f^2$ on the shaft $f^3$ which has keyed to it the belt driving-pulley $f^4$. The same shaft $g^2$ carries a spur-wheel $h$ which gears with the pinion H (shown as being formed in the spindle $h^3$ itself) which operates the grippers G and $G^1$ hereinafter described, the motion for the two pairs of grippers being driven from the same spindle $h^3$.

After the pusher E has acted to push the caramel off the band $f$ or chain through the opening $i$ in the guide plate I and against the paper and then both the caramel and paper through the opening $i^1$ in the opposite guide-plate $I^1$ into the mould-wheel recess $a$ which is, at that time, opposite the caramel and paper, the cutter J acts to cut off the amount of paper for the wrapper and, the caramel, being then covered on three sides by the wrapper so applied, the pusher E retires ready to repeat the same operation with the next caramel and wrapper when the next recess in the mould-wheel is presented in line with the said pusher. The paper thus applied is long enough to be wrapped around the caramel with any desired amount of overlap and is of a width to project beyond both ends of the caramel to a sufficient extent to allow of being twisted to complete the wrapping. The next partial rotation of the mould-wheel brings the recess, with the caramel and wrapper in it, into the position in which the outstanding portions $x$, $x^1$ of the wrapper pass against the stationary folder K as shown in Figures 6 and 7 which causes the first outstanding portion $x$ to be partially bent over the fourth side of the caramel, a movable folder L being operated from the cam $l$ on the shaft D acting upon a roller $l^1$ on the lever $l^2$ turning on the pivot $l^3$, and drawn downwards by a spring $l^4$ and through the rod $l^5$, drawing down the folder L so that it folds the outstanding portion $x^1$ of the paper in a double fold under the aforesaid partially bent portion $x$ as shown in Figure 7. When the mould-wheel A makes its next movement of partial rotation the part $k$ which forms a continuation of the stationary folder K concentric with the mould-wheel A, retains the wrapper in its folded position. If the part $x$ of the wrapper be sufficient to overlap the side of the caramel which it covers the overlapping portion can be folded down by any suitably actuated folder.

The twisting of the wrapper projecting from the ends of the caramel is effected by the grippers G and $G^1$ shown clearly in elevations and plans in two positions in Figures 8, 9, 10 and 11. Figures 8 and 9 showing the grippers in the open position and Figures 10 and 11 showing them in the closed position. Each gripper consists of jaws $g^4$ (which may have roughened gripping faces) connected by a closing spring $g^5$ and pivoted at $g^6$ to the spindle $h^3$ and geared together by the segmental gears $g^7$ the tail end of one of the jaws of the gripper G being acted upon (to open the gripper jaws) by a projection $g^8$ (see Figure 2) on one arm $g^9$ of a bell-crank lever (keyed on the shaft $g^{10}$) which is operated by a cam $g^{11}$ on the main shaft D acting on a roller $g^{12}$ on the other arm $g^{13}$ of the said lever against the action of a spring $g^{14}$ for closing the jaws the other jaw of the said gripper having the opening motion conveyed to it through the segmental gear $g^7$. The gripper $G^1$ is simultaneously operated upon by a projection $g^{15}$ on a lever $g^{16}$ keyed to the said shaft $g^{10}$. The grippers G and $G^1$ thus gripping the respective ends of the wrapper are rotated from the main shaft D through any means such, for example, as the Geneva motion indicated at $g$, and the toothed wheel $h$ on the shaft $g^2$ which toothed wheel then rotates the long pinion H formed in the gripper spindle $h^3$ which is capable of moving longitudinally in the bearings $c$ in the frame C whilst rotating. Rotary movement of the gripper spindle $h^3$ of gripper G is conveyed to the other gripper spindle by a toothed wheel $h^4$ secured to a shaft $h^5$ provided with another toothed wheel $h^6$ which gears with the long pinion $H^1$ formed in the spindle $h^3$ of the gripper $G^1$.

The pinions H and $H^1$ are long so that they remain always in gear with the wheels $h$ and $h^6$ as the grippers have to be moved longitudinally towards each other to follow the shortening of the ends of the wrapper due to the twisting. This longitudinal movement is effected by means of levers M pivoted at $m$ to brackets $m^1$ projecting from the frame C and acted upon by face cams $m^2$ on the main shaft D so that the opposite arms of the levers M press inwards the gripper spindles $h^3$ against the action of springs $m^3$ which bear upon the collars $m^4$ secured to the ends of the gripper spindles to move them outwards. After sufficient twist has been given to the ends of the wrapper the jaws of the grippers are opened by the projections $g^9$ and $g^{15}$ on the levers $g^9$ and $g^{16}$ respectively and the springs $m^3$ will act to move the grippers away from each other so that they will be free of the now completely wrapped caramel which will at the next partial rotation of the mould-wheel be acted upon by the ejector N and expelled from the recess $a$ in the mould-wheel A, as described and illustrated in the specification of British Letters Patent No. 16680 A. D. 1911. To keep the wrapper in position on the caramel whilst the twisting is being effected we have shown, in Figures 6 and 7 the yieldable presser $k^1$ acted upon by a spring $k^2$ secured to the continuation $k$ of the stationary folder K, this presser $k^1$ holding the wrapper on the caramel sufficiently to retain it in position whilst the grippers are operating to twist the ends of the wrapper.

One of the sides of each recess in the mould-wheel A is adapted to yield. Figure 7 shows that the twisting and removal of the wrapped caramel can be facilitated by causing such yieldable sides $a^3$ to be opened somewhat whilst the twisting is being effected, which opening can be effected by an arm $g^{17}$ on the boss of the lever $g^{16}$, having a projection $g^{18}$ which engages with a tailpiece $a^4$ on the said yieldable side and causes the said side to open when the grippers are closed and twisting of the wrapper is being effected.

What I claim is:—

1. In a wrapping machine, the combination with an intermittently partially rotatable mould-wheel, means for feeding wrappers into proximity thereto, means for conveying the articles to be wrapped to a position in line with the recesses in the mould wheel, and means for forcing the articles and wrappers into the recesses in the mould-wheel whereby the wrappers are folded around three sides of the articles, of means for folding the two outstanding portions of the wrappers around the outer, or fourth, side of the articles, the said means comprising a stationary folder which causes one outstanding portion of the wrapper to be first partially bent over the outer, or fourth, side of the article, and a movable folder which folds the other outstanding portion of the said wrapper in a double fold under the aforesaid partially bent portion, the said stationary folder thereafter acting to press and retain both of the aforesaid portions onto the outer, or fourth, side of the article, rotatable and longitudinally movable grippers, for twisting the projecting open ends of the wrappers, for completing the wrapping, the said grippers operating to follow up the shortening of the ends due to the said twisting, means for removing the wrapped articles from the recesses in the mould-wheel, and means for operating the several parts at the proper relative times, all substantially as hereinbefore explained.

2. In a wrapping machine, means for folding the outstanding portions of the wrappers around the outer, or fourth, side of the articles in accordance with the preceding claim 1, the said means comprising the combination of a stationary folder having a part constituting an extension thereof, concentric with the mould-wheel, an oscillatory folder, a lever, a rod connecting the said oscillatory folder and lever, and means for actuating the said lever, substantially as hereinbefore described.

3. In a wrapping machine, means for twisting the ends of the wrappers, the said twisting means comprising grippers each consisting of a pair of geared gripping jaws pivotally mounted on longitudinally movable spindles, means for opening and closing the said gripping jaws, the said latter means comprising springs connected to, and acting to close, each of the said pairs of gripping jaws, a gripper opening shaft, arms keyed to the said shaft, and each adapted to bear on a tail on one of the jaws of the respective pairs of grippers, a third arm keyed to the said gripper opening shaft, a main driving shaft, a cam on the said shaft adapted to operate the said third arm so as to turn the said gripper opening shaft whereby the first mentioned arms, are caused to simultaneously open the jaws of the respective pairs of grippers in opposition to the action of their springs, means for rotating the said grippers comprising a short shaft, a toothed wheel on the said short shaft, a gear adapted to transmit rotary motion from main driving shaft to the said toothed wheel, a long pinion on one of the aforesaid longitudinally movable spindles in engagement with the said toothed wheel whereby one of the pairs of grippers is caused to rotate, an intermediate shaft, a gear adapted to transmit rotary motion from the short shaft to said intermediate shaft, a toothed wheel on the said intermediate shaft in engagement with a long pinion on the other of the aforesaid longitudinally movable spindles whereby the other pair of grippers is caused to rotate, and means for longitudinally moving the grippers towards each other to follow the shortening of the ends of the wrapper due to the twisting, the said means comprising pivotally mounted levers one end of each of which is adapted to bear on the outer end of the aforesaid longitudinally movable spindle of the respective pair of grippers and face cams on the main driving shaft adapted to bear on the free ends of the said levers so that by the rotation of the said cams the said levers are actuated to move the said spindles longitudinally towards each other in opposition to the action of springs, all combined, arranged and operating substantially as hereinbefore described.

4. In a wrapping machine, a mould-wheel, a stationary folder having an extension concentric with the mould-wheel, a yieldable presser mounted on the said extension and adapted to bear on the wrapper and object being wrapped to hold them in position whilst the ends are being twisted.

5. In a wrapping machine, a gripper and a gripper-opening shaft, a mould-wheel having a yieldable side, a tail-piece in said side of the mould-wheel, a gripper opening shaft, an arm secured thereto, and a projection on the said arm adapted to bear on the said tail-piece to cause the yieldable side of the mould-wheel to open when the grippers are closed and twisting of the wrapper is being effected, substantially as hereinbefore described.

In testimony whereof I have signed my name to this specification in the presence of two subscribing witnesses.

WILLIAM HENRY ROSE,
*Administrator of Henry Rose, deceased.*

Witnesses:
A. R. ADAMS,
E. O. GEORGE.